(12) United States Patent
Lin

(10) Patent No.: US 9,875,018 B2
(45) Date of Patent: Jan. 23, 2018

(54) ELECTRONIC DEVICE AND TEXT-INPUT INTERFACE DISPLAYING METHOD THEREOF

(71) Applicant: Wistron Corp., New Taipei (TW)

(72) Inventor: Yu-Jui Lin, New Taipei (TW)

(73) Assignee: Wistron Corp., New Taipei (TW)

( * ) Notice: Subject to any disclaimer, the term of this patent is extended or adjusted under 35 U.S.C. 154(b) by 401 days.

(21) Appl. No.: 14/157,229

(22) Filed: Jan. 16, 2014

(65) Prior Publication Data
US 2015/0082234 A1    Mar. 19, 2015

(30) Foreign Application Priority Data

Sep. 17, 2013 (TW) .............................. 102133591 A

(51) Int. Cl.
*G06F 3/0488* (2013.01)
*G06F 3/01* (2006.01)
*G06F 3/023* (2006.01)
*G06F 3/0481* (2013.01)

(52) U.S. Cl.
CPC .......... *G06F 3/04883* (2013.01); *G06F 3/018* (2013.01); *G06F 3/0236* (2013.01); *G06F 3/0481* (2013.01); *G06F 3/04886* (2013.01)

(58) Field of Classification Search
CPC .................................................. G06F 3/04886
See application file for complete search history.

(56) References Cited

U.S. PATENT DOCUMENTS

| | | | | |
|---|---|---|---|---|
| 5,812,117 | A * | 9/1998 | Moon | G06F 3/0236 345/168 |
| 6,016,142 | A * | 1/2000 | Chang | G06F 3/0236 345/168 |
| 6,098,086 | A * | 8/2000 | Krueger | G06F 3/018 707/999.101 |
| 6,809,725 | B1 * | 10/2004 | Zhang | G06F 3/018 345/171 |
| 7,257,528 | B1 * | 8/2007 | Ritchie | G06F 3/0236 341/28 |

(Continued)

FOREIGN PATENT DOCUMENTS

| | | |
|---|---|---|
| CN | 101989169 A | 3/2011 |
| CN | 102171641 A | 8/2011 |

OTHER PUBLICATIONS

China Patent Office, Office Action, Patent Application Serial No. 201310449921.1, dated Apr. 5, 2017, China.

*Primary Examiner* — Ryan Barrett

(57) ABSTRACT

The present invention discloses an electronic device including a storage device, an input device, a display device and a processing unit. The storage device stores an input rule table. The input device receives at least one input signal corresponding to text editing. The display device is arranged to display a text input interface, wherein the text input interface comprises a first display region and a second display region provided for users to do the text editing by the input device, wherein the display device has a display region, the display region has a predetermined display area, and the text input interface has an interface area. The processing dynamically adjusts the interface area of the text input interface to change the ratio of the interface area and the predetermined display area of the display region according to the input signal and the input rule table.

23 Claims, 10 Drawing Sheets

(56) References Cited

U.S. PATENT DOCUMENTS

| | | | |
|---|---|---|---|
| 7,768,501 B1* | 8/2010 | Maddalozzo, Jr. | G06F 3/04886 345/163 |
| 8,904,309 B1* | 12/2014 | Zhai | G06F 3/0237 715/773 |
| 2003/0197687 A1* | 10/2003 | Shetter | G06F 3/04886 345/173 |
| 2003/0210270 A1* | 11/2003 | Clow | G06F 3/0481 715/767 |
| 2006/0033724 A1* | 2/2006 | Chaudhri | G06F 3/0482 345/173 |
| 2008/0155462 A1* | 6/2008 | Nilakantan | G06F 3/04855 715/786 |
| 2009/0037837 A1* | 2/2009 | Raghunath | G06F 3/04886 715/773 |
| 2009/0040184 A9* | 2/2009 | Pu | G01C 21/3611 345/171 |
| 2009/0077464 A1* | 3/2009 | Goldsmith | G06F 3/0237 715/257 |
| 2009/0167706 A1* | 7/2009 | Tan | G06F 3/04883 345/173 |
| 2010/0231523 A1* | 9/2010 | Chou | G06F 3/018 345/171 |
| 2011/0202836 A1* | 8/2011 | Badger | G06F 3/0237 715/702 |
| 2011/0202876 A1* | 8/2011 | Badger | G06F 3/0237 715/816 |

* cited by examiner

ELECTRONIC DEVICE AND TEXT-INPUT INTERFACE DISPLAYING METHOD THEREOF

CROSS REFERENCE TO RELATED APPLICATIONS

This Application claims priority of Taiwan Patent Application No. 102133591, filed on Sep. 17, 2013, the entirety of which is incorporated by reference herein.

BACKGROUND OF THE INVENTION

Field of the Invention

The present invention relates to a text-input interface displaying method of an electronic device, and in particular to a text-input interface displaying method for adjusting the area of the text-input interface.

Description of the Related Art

Presently, mobile devices are highly developed and multifunctional. For example, handheld devices such as mobile phones and tablets are capable of conducting telecommunications, receiving and transmitting e-mails, maintaining social networks, managing contacts, and playing media. Hence, users can implement various applications on their mobile devices, such as a simple phone call, social network interaction, or commercial transactions. Therefore, mobile devices have become one of the necessities in people's lives.

Most of the current handheld devices include a touch module arranged to provide users with a method for inputting signal. The layout of the control interface applied in the small touch module is limited, which may cause inconvenience for users in some conditions.

BRIEF SUMMARY OF THE INVENTION

A detailed description is given in the following embodiments with reference to the accompanying drawings.

The present invention discloses an electronic device including a storage device, an input device, a display device and a processing unit. The storage device is arranged to store at least one input rule table. The input device is arranged to receive at least one input signal corresponding to text editing. The display device is arranged to display a text input interface, wherein the text input interface comprises a first display region and a second display region, the first display region and the second display region are provided for users to do text editing via the input device, wherein the display device has a display region, the display region has a predetermined display area, and the text input interface displayed on the display region has an interface area. The processing unit is arranged to dynamically adjust the interface area of the text input interface to change the ratio of the interface area and the predetermined display area of the display region according to the input signal and the input rule table.

Additionally, the present invention further discloses a text-input interface displaying method applied to an electronic device having an input device and a display device. The display device has a display region, and the display region has a predetermined display area. The text-input interface displaying method includes: displaying a text input interface on the display region, wherein the text input interface has a first display region and a second display region, the first display region and the second display region are provided for users to do text editing by the input device, and the text input interface has an interface area; and dynamically adjust the interface area of the text input interface to change the ratio of the interface area and the predetermined display area of the display region according to the input signal and the input rule table.

BRIEF DESCRIPTION OF THE DRAWINGS

The present invention can be more fully understood by reading the subsequent detailed description and examples with references made to the accompanying drawings, wherein:

FIGS. 4A-4E are schematic diagrams illustrating embodiments of Chinese interfaces of the present invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Present electronic devices have a variety of operation systems (OS). The different operation systems may include different text input methods. For example, Android has high market share and free coding environment. Furthermore, developers are free to design their own IME (Input Method Editor) in the Android environment, wherein the IME of the Android system is an Android Application including specific IME service, and the Android system provides a Public Class called "InputMethodService" for developers. The Public Class provides most methods that may be used in developing IME, such as state or visibility which are arranged to manage IME's state and communication by input field. Therefore, developers may extend "InputMethodService" to develop text input methods and User Interfaces when developers writes the IME with JAVA.

Figure 1:
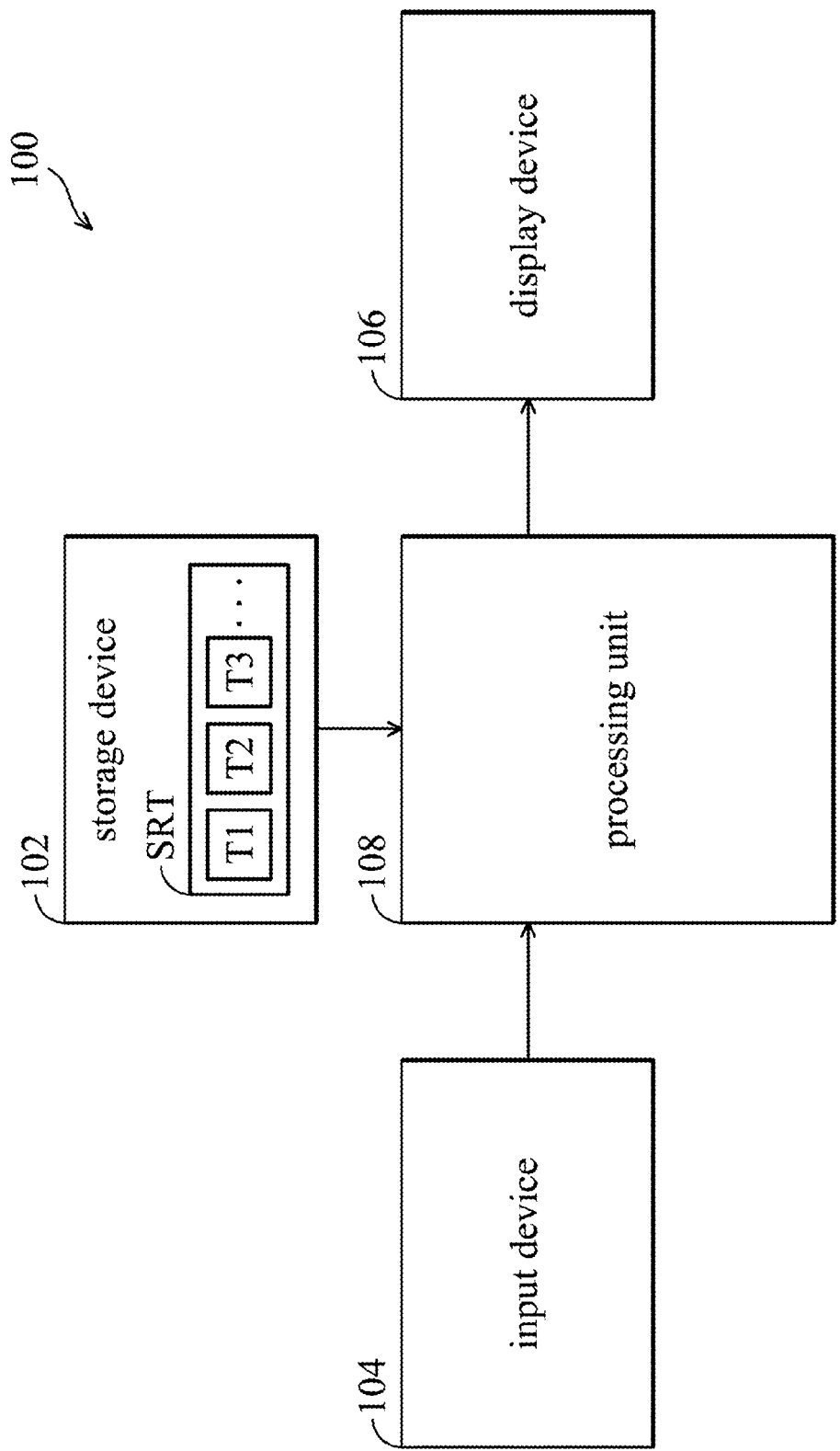
FIG. 1 is a schematic diagram illustrating an embodiment of an electronic device of the present invention.
Figure 2:
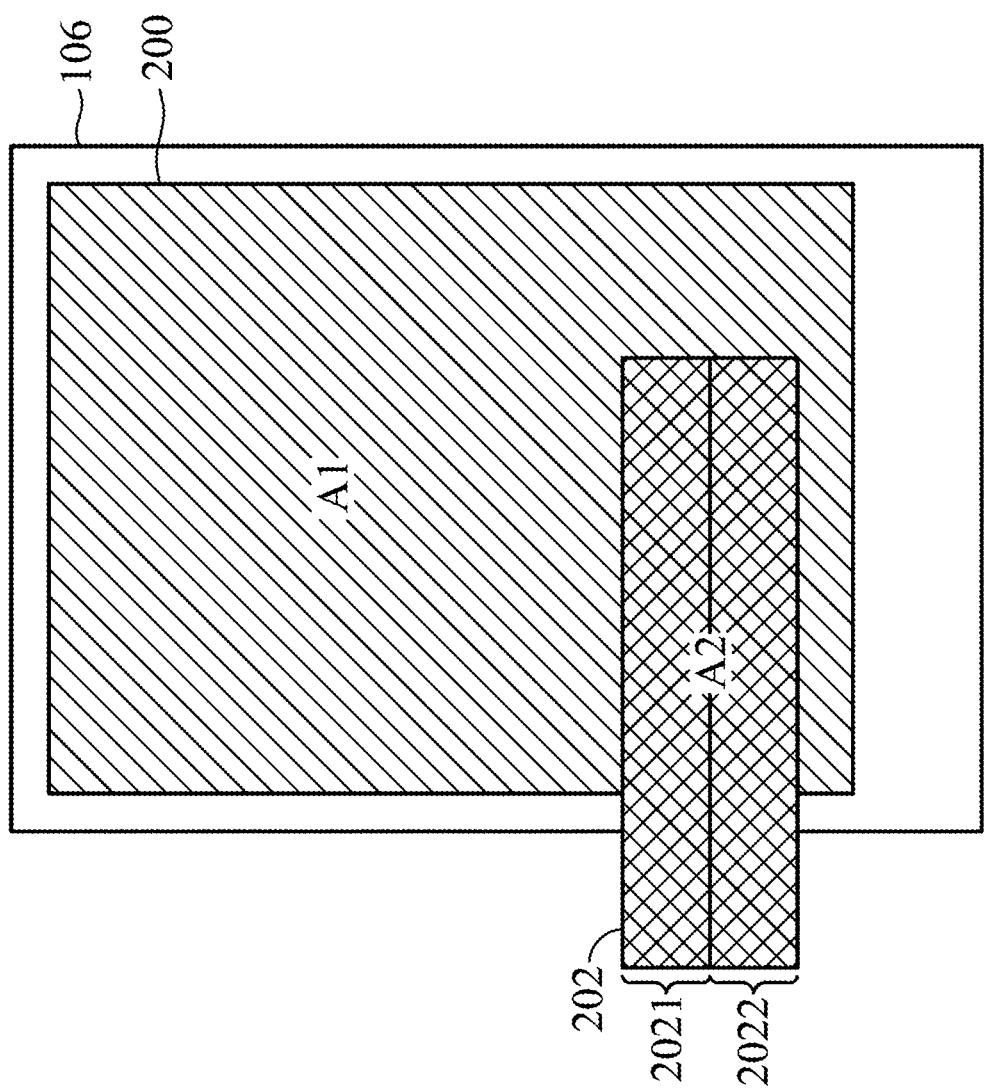
FIGS. 2-3 are schematic diagrams illustrating an embodiment of a display device of the present invention.

Refer to FIG. 1 and FIG. 2, the electronic device 100 can be a tablet, smart phone, or PDA with text input interface 202, etc., but it is not limited thereto. The electronic device 100 may be practiced with other computer system configurations, including hand-held devices, multiprocessor-based, microprocessor-based or programmable consumer electronics, network PCs, minicomputers, mainframe computers, and the like. In one of the embodiments, the electronic device 100 is a wearable electronic device with a text input interface 202, such as wearable electronic bracelets, wearable electronic watches or wearable electronic glasses, etc., and users may do Chinese text editing, English text editing, number/punctuation text editing and/or Japanese text editing through the text input interface 202, but it is not limited thereto.

The electronic device 100 includes a storage device 102, an input device 104, a display device 106 and a processing unit 108. The storage device 102 is arranged to store at least one input rule table SRT. For example, the input rule table SRT may include a Chinese input rule table T1, an English input rule table T2 and/or a Japanese input rule table T3. The input device 104 is arranged to receive at least one input signal corresponding to the text editing. For example, the input device 104 can be a mouse, a keyboard, a touch panel and/or a touch pad, but it is not limited thereto. The display device 106 is arranged to display a text input interface 202, wherein the text input interface 202 has a first display region 2021 and a second display region 2022, the first display region 2021 and the second display region 2022 are provided for users to do the text editing by the input device 104, wherein the display device 106 has a display region 200 (refer to FIG. 2). For example, the display device 106 can be an LED display, an LCD display, a flexible display, etc., it is not limited thereto. The processing unit 108 may include a central-processing unit (CPU), a graphics processing unit (GPU), or a plurality of parallel processing units related in a parallel processing environment. The memory device can include a read only memory (ROM), a flash ROM and/or a random access memory (RAM), arranged to store the programs used for executing by the processing unit 108. In one of the embodiments, the processing unit 108 is arranged to dynamically adjust the interface area A2 of the text input interface 202 to change the ratio of the interface area A2 and the predetermined display area A1 of the display region according to the input signal received by the input device 104 and the input rule table SRT stored in the storage device 102. It should be noted that the processing unit 330 can be disposed in the chipset of the display device 106 or another processor which is outside of the display device 106.

The display region 200 has a predetermined display area A1, and the text input interface 202 displayed on the display region 200 has an interface area A2, wherein the text input interface 202 has a first display region 2021 and a second display region 2022. It should be noted that, in other embodiments, the text input interface 202 may include one display region or more than two display regions, it is not limited thereto.

Figure 3:
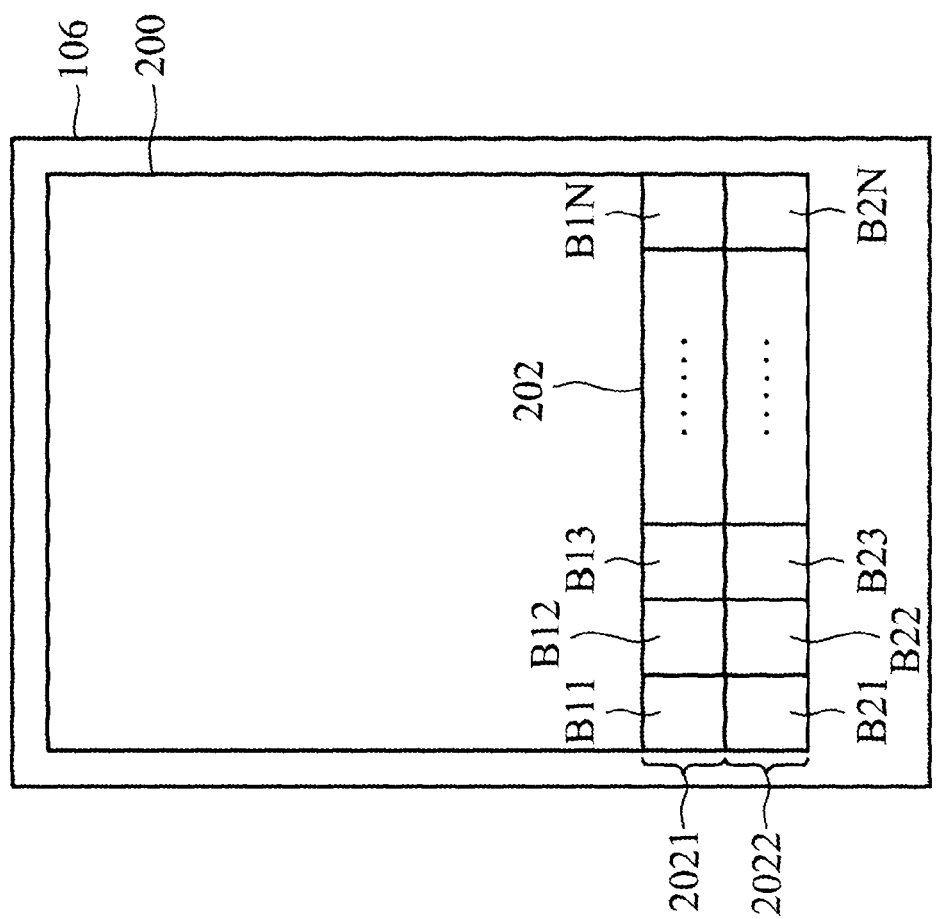

As shown in FIG. 3, the first display region 2021 has a plurality of display blocks B11-B1N. The second display region 2022 has a plurality of display blocks B21-B2N. Each of the display blocks B11-B1N/B21-B2N is arranged to display a character, including as English characters, Chinese characters (words), Chinese Zhuyin characters, punctuation characters, etc. It should be noted that the processing unit 108 is arranged to enable the text input interface 202 to present the display blocks which are not in use as transparent for changing the ratio of the interface area A2 and the predetermined display area A1 of the display region 200. It should be noted that, in some embodiments, the first display region 2021 is arranged above the second display region 2022 horizontally, but it is not limited thereto. In another embodiment, the second display region 2022 can be arranged above the first display region 2021 horizontally. Moreover, the first display region 2021 and the second display region 2022 may also be arranged vertically side by side, or arranged apart vertically/horizontally, it is not limited thereto.

In one of the embodiments, the input device 104 is a touch module disposed above the display region 200 of the display device 106 for covering the display region 200. When the input signal received by the input device 104 is a predetermined gesture sliding to the left and/or the right on the first display region 2021, the processing unit 108 enables the first display region 2021 to display the other characters by scroll tumbling. When the input signal received by the input device 104 is a predetermined gesture sliding to the left and/or the right on the second display region 2022, the processing unit 108 enables the second display region 2022 to display the other characters by scroll tumbling.

For example, when the input signal received by the input device 104 is a predetermined gesture sliding to the left on the first display region 2021, the processing unit 108 replaces the character displayed on the display block B11 by the character displayed on the display block B12, replaces the character displayed on the display block B12 by the character displayed on the display block B13, replaces the character displayed on the display block B13 by the character displayed on the display block B14, and so on. Moreover, the processing unit 108 enables the display block B1N to display a new character. When the input signal received by the input device 104 is a predetermined gesture sliding to the right on the first display region 2021, the processing unit 108 replaces the character displayed on the display block B1N by the character displayed on the display block B1N−1, replaces the character displayed on the display block B1N−1 by the character displayed on the display block B1N−2, replaces the character displayed on the display block B1N−2 by the character displayed on the display block B1N−3, and so on. Moreover, the processing unit 108 enables the display block B11 to display a new character.

Figures 4A, 4B:
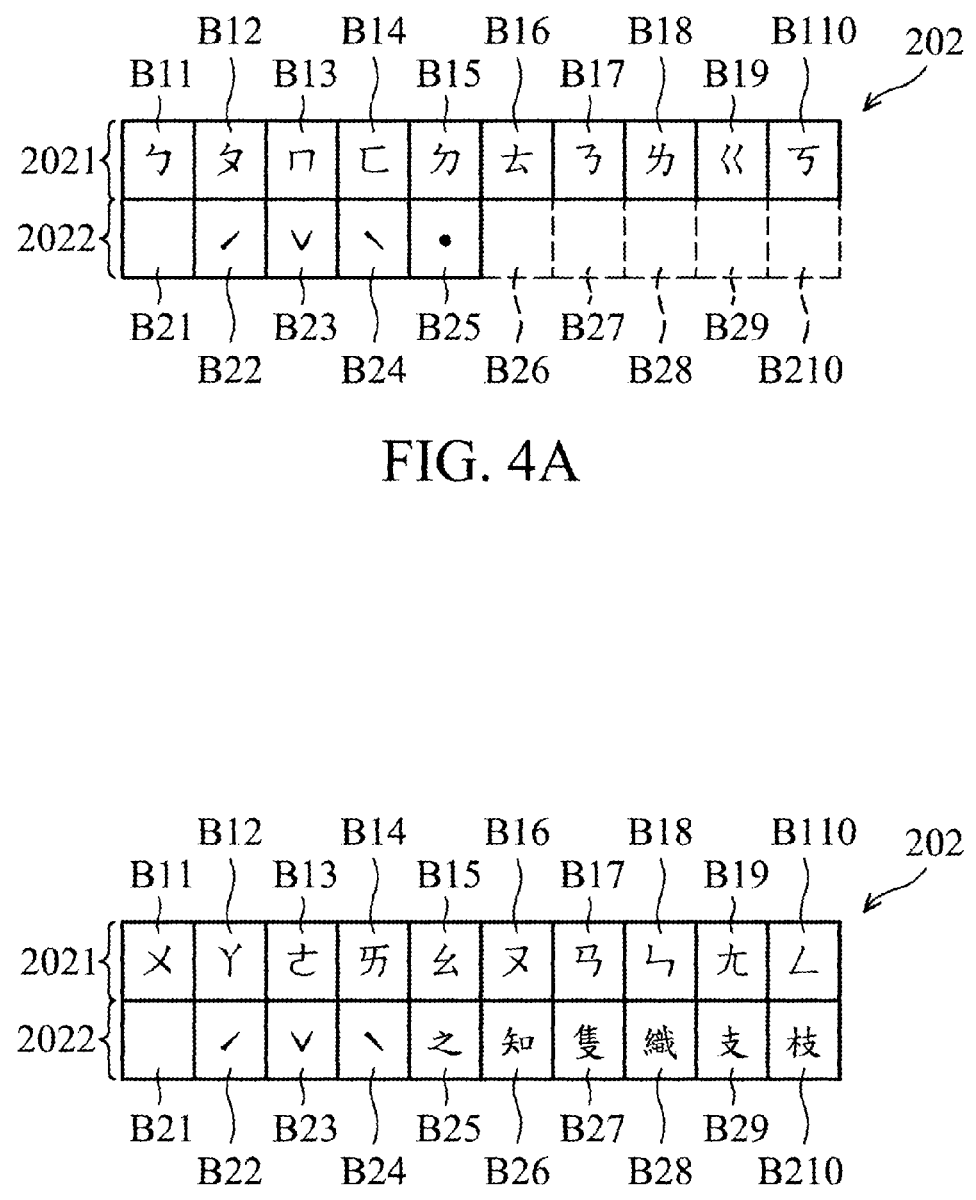
Figure 4C:
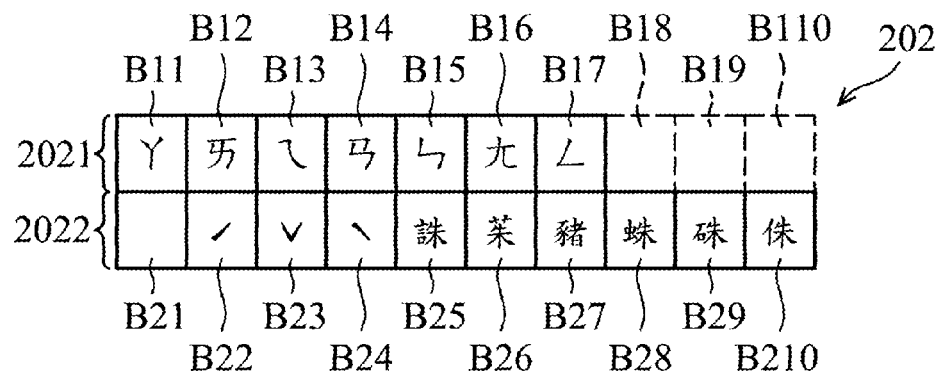

In another embodiment, the text input interface 202 is capable of switching between a plurality of language interfaces. For example, when the input signal received by the input device 104 is a predetermined gesture sliding up and/or down, the processing unit 108 enables the text input interface 202 to switch the language interfaces. In another embodiment, when the input signal received by the input device 104 is a predetermined gesture sliding up, the processing unit 108 enables the text input interface 202 to switch the language interfaces. When the input signal received by the input device 104 is a predetermined gesture sliding down, the processing unit 108 enables the text input interface 202 to perform the Backspace function, but it is not limited thereto. In another embodiment, when the input signal received by the input device 104 is a predetermined gesture sliding up, the processing unit 108 enables the text input interface 202 to perform the Backspace function. FIG. 4A is a schematic diagram illustrating an embodiment of Chinese interfaces of the present invention. For example, the text input interface 202 has a Chinese default interface when the text input interface 202 operates as a Chinese interface, as shown in FIG. 4A-4E. It should be noted that the Chinese input rule table T1 corresponding to the Chinese interface includes a variety of combinations of the Chinese Zhuyin characters and a variety of combinations of the Chinese words, wherein the combinations of the Chinese Zhuyin characters can be determined by the relationship of the vowels and the consonants. In the Chinese default interface, the first display region 2021 is arranged to display all of the Chinese Zhuyin characters, and the second display region 2022 is arranged to display the five tones of Chinese. It should be noted that, in one embodiment, the display blocks B11-B1N of the first display region 2021 are not capable of displaying all of the Chinese Zhuyin characters at once, such that the first display region 2021 displays a first set of Chinese Zhuyin characters in sequence. When the input signal received by the input device 104 is a gesture sliding to the left and/or right on the first display region 2021, the processing unit 108 enables the first display region 2021 to adjust the first set of the Chinese Zhuyin characters to display the other Chinese Zhuyin characters by scroll tumbling.

In this embodiment, the first display region 2021 has ten display blocks B11-B110, and the second display region 2022 also has ten display blocks B21-B210, but it is not limited thereto. The display blocks B11-B110 are arranged to display the first set of the Chinese Zhuyin characters "ㄅ"-"ㄎ". When the input signal received by the input device 104 is a predetermined gesture sliding to the left on the first display region 2021, the processing unit 108 enables the first display region 2021 to display the Chinese Zhuyin characters after the "ㄎ" by scroll tumbling sequentially one by one. The display blocks B21-B25 are arranged to display the five tones of Chinese. The processing unit 108 is further arranged to enable the display blocks B26-B210 of the second display region 2022, which are not used for displaying the tones, to be transparent for changing the ratio of the interface area A2 and the predetermined display area A1 of the display region 200.

For example, when the input signal received by the input device 104 is a predetermined gesture sliding to the left on the first display region 2021, the processing unit 108 replaces the Chinese Zhuyin character "ㄅ" displayed on the display block B11 by the Chinese Zhuyin character "ㄆ", and so on. Moreover, the processing unit 108 enables the display block B10 to display the new Chinese Zhuyin character "ㄏ". Next, when the input signal received by the input device 104 is a predetermined gesture sliding to the left on the first display region 2021 again or the received input signal continues to slide to the left, the processing unit 108 replaces the Chinese Zhuyin character "ㄆ" by the Chinese Zhuyin character "ㄇ" displayed on the display block B12, and so on. Moreover, the processing unit 108 enables the display block B110 to display the new Chinese Zhuyin character "ㄐ". Next, when the input signal received by the input device 104 is a predetermined gesture sliding to the right on the first display region 2021, the processing unit 108 replaces the Chinese Zhuyin character "ㄐ" displayed on the display block B10 by the Chinese Zhuyin character "ㄏ" displayed on the display block B19, and so on. Moreover, the processing unit 108 enables the display block B11 to display the new Chinese Zhuyin character "ㄆ". Moreover, the second display region 2022 has at least five display blocks B21-B2N arranged to display the five tones of Chinese including the second tone " ", the third tone " ˇ ", the fourth tone "", the fifth tone "*" and a space key representing the first tone. In the Chinese default interface, the second display region 2022 is only arranged to display the five tones, such that the processing unit 108 is further arranged to enable the display blocks of the second display region 2022 to be transparent except for the display blocks arranged to display the five tones for changing the ratio of the interface area A2 and the predetermined display area A1 of the display region 200.

When the input signal received by the input device 104 is in response to an operation on the Chinese default interface shown in FIG. 4A and arranged to select a first Chinese Zhuyin character of the first set of the Chinese Zhuyin characters that may be displayed on the first display region 2021, the processing unit 108 enables the first display region 2021 to display a second set of the Chinese Zhuyin characters corresponding to the first Chinese Zhuyin character and enables the second display region 2022 to display the Chinese character(s) and tone(s) corresponding to the first Chinese Zhuyin character according to the Chinese input rule table T1. For example, as shown in FIG. 4B, when the input signal received by the input device 104 is in response to an operation on the Chinese default interface shown as FIG. 4A and arranged to select the Chinese Zhuyin character "ㄓ" of the first set of the Chinese Zhuyin characters that may be displayed on the first display region 2021, the processing unit 108 enables the first display region 2021 to display a second set of the Chinese Zhuyin characters "ㄨ", "ㄚ", "ㄛ", "ㄞ", "ㄠ", "ㄡ", "ㄢ", "ㄣ", "ㄤ" and "ㄥ" corresponding to the selected Chinese Zhuyin character "ㄓ" and enables the second display region 2022 to display the Chinese characters "之","知","隻","織","支","枝" and the tones " ", " ′ ", " ˇ " and " ` " corresponding to the selected Chinese Zhuyin character "ㄓ" according to the Chinese input rule table T1. It should be noted that, in other embodiments, when the number of Chinese Zhuyin characters in the second set is less than the number of display blocks B11-B1N, the processing unit 108 is further arranged to enable the display blocks of the first display region 2021 to be transparent except for the display blocks arranged to display the second set of Chinese Zhuyin characters for changing the ratio of the interface area A2 and the predetermined display area A1 of the display region 200. When the number of the Chinese character(s) and tone(s) corresponding to the first Chinese Zhuyin character is less than the number of the display blocks B21-B2N, the processing unit 108 is further arranged to enable the display blocks of the second display region 2022 to be transparent except for the display block(s) arranged to display the Chinese character(s) and tone(s) corresponding to the first Chinese Zhuyin character, such that the ratio of the interface area A2 and the predetermined display area A1 of the display region 200 is changed. When the number of Chinese Zhuyin characters in second set is more than the number of the display blocks B11-B1N, users may perform a gesture consisting of sliding to the left or the right on the first display to enable the second set of Chinese Zhuyin characters to show the other Chinese Zhuyin characters, but it is not limited thereto. When the number of the Chinese character(s) and tone(s) corresponding to the first Chinese Zhuyin character is more than the display blocks B21-B2N, users may perform a gesture consisting of sliding to the right or the left on the second display region 2022 to select the other Chinese characters corresponding to the first Chinese Zhuyin character, but it is not limited thereto.

When the input signal received by the input device 104 is arranged to select a second Chinese Zhuyin character of the second set of the Chinese Zhuyin characters, the processing unit 108 enables the first display region 2021 to display a third set of the Chinese Zhuyin characters corresponding to the first Chinese Zhuyin character and the second Chinese Zhuyin character and enables the second display region 2022 to display the Chinese character(s) and tone(s) corresponding to the first Chinese Zhuyin character and the second Chinese Zhuyin character according to the Chinese input rule table T1. As shown in FIG. 4C, when the input signal received by the input device 104 is arranged to select the Chinese Zhuyin character "ㄨ" of the second set of the Chinese Zhuyin characters, the processing unit 108 enables the first display region 2021 to display a third set of the Chinese Zhuyin characters "ㄚ", "ㄞ", "ㄟ", "ㄢ", "ㄣ", "ㄤ", "ㄥ" corresponding to the selected Chinese Zhuyin character "ㄓ" and "ㄨ", and enables the second display region 2022 to display the Chinese characters "誅", "朱", "豬", "蛛", "硃", "侏" and tones " ", " ", " ˇ ", "" corresponding to the selected "ㄓ" and "ㄨ" according to the Chinese input rule table T1. In this embodiment, the number of the third set of the Chinese Zhuyin characters is less than the number of the display blocks B11-B1N, such that the processing unit 108 is further arranged to enable the display blocks of the first display region 2021 to be transparent except for the display blocks arranged to display the third set of the Chinese Zhuyin characters for changing the ratio of the interface area A2 and the predetermined display area A1 of the display region 200. In other embodiment, when the number of the third set of the Chinese Zhuyin characters is more than the number of the display blocks B11-B1N, users may perform a gesture sliding to the left or the right on the first display region 2021 to select the other Chinese Zhuyin characters of the third set of the Chinese Zhuyin characters, but it is not limited thereto. When the number of the Chinese character(s) and tone(s) corresponding to the first Chinese Zhuyin character and the second Chinese Zhuyin character is less than the number of the display blocks B21-B2N, the processing unit 108 is further arranged to enable the display blocks of the second display region 2022 to be transparent except for the display block(s) arranged to display the Chinese character(s) and tone(s) corresponding to the first Chinese Zhuyin character and the second Chinese Zhuyin character, such that the ratio of the interface area A2 and the predetermined display area A1 of the display region 200 is changed. When the number of the Chinese character(s) and tone(s) corresponding to the first Chinese Zhuyin character and the second Chinese Zhuyin character is more than the number of the display blocks B21-B2N, users may perform a gesture consisting of sliding to the left or the right on the second display region 2022 to select the other Chinese characters corresponding to the first Chinese Zhuyin character and the second Chinese Zhuyin character, it is not limited thereto.

Figure 4D:
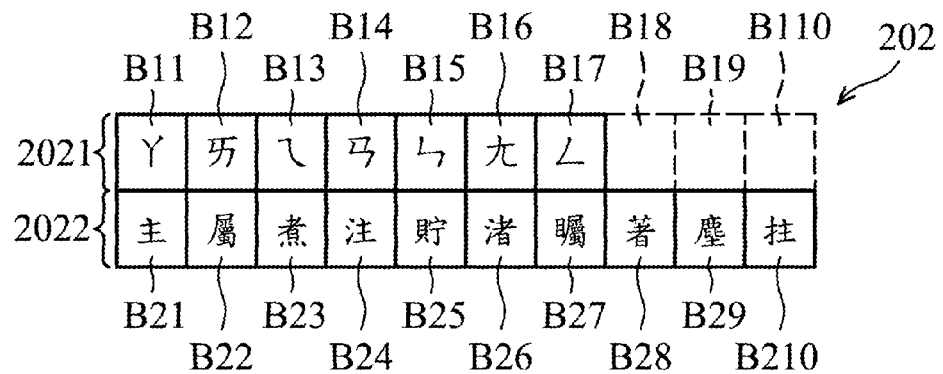

When the input signal received by the input device 104 is arranged to select a first tone corresponding to the first Chinese Zhuyin character and the second Chinese Zhuyin character, the processing unit 108 enables the first display region 2021 to display a fourth set of the Chinese Zhuyin characters corresponding to the first Chinese Zhuyin character, the second Chinese Zhuyin character and the selected first tone, and enables the second display region 2022 display the Chinese characters corresponding to the first Chinese Zhuyin character, the second Chinese Zhuyin character and the selected first tone according to the Chinese input rule table T1. As shown in FIG. 4D, when the input signal received by the input device 104 is arranged to select the third tone "ˇ" corresponding to the selected Chinese Zhuyin characters "ㄓ" and "ㄨ", the processing unit 108 enables the first display region 2021 to display a fourth set of the Chinese Zhuyin characters "ㄚ", "ㄞ", "ㄟ", "ㄢ", "ㄣ", "ㄤ" and "ㄥ" corresponding to the selected "ㄓ", "ㄨ" and "ˇ", and enables the second display region 2022 to display the Chinese characters "主", "属", "煮", "注", "佇", "渚", "囑", "著", "麈", "拄" corresponding to the selected "ㄓ", "ㄨ" and "ˇ" according to the Chinese input rule table T1. In this embodiment, the number of the fourth set of the Chinese Zhuyin characters is less than the number of the display blocks B11-B1N, such that the processing unit 108 is further arranged to enable the display blocks of the first display region 2021 to be transparent except for the display blocks arranged to display the fourth set of the Chinese Zhuyin characters for changing the ratio of the interface area A2 and the predetermined display area A1 of the display region 200. Namely, the processing unit 108 is further arranged to enable the display blocks B18-B110 of the first display region 2021 to be transparent. In other embodiments, the number of the fourth set of the Chinese Zhuyin characters is less than the number of the display blocks B11-B1N, users may perform a gesture consisting of sliding to the left or to the right on the first display region 2021 for selecting the other Chinese Zhuyin characters of the fourth set of the Chinese Zhuyin characters, but it is not limited thereto. When the number of the Chinese characters corresponding to the first Chinese Zhuyin character, the second Chinese Zhuyin character and the first tone is less than the number of the display blocks B21-B2N, the processing unit 108 is further arranged to enable the display blocks of the second display region 2022 to be transparent except for the first Chinese Zhuyin character, the second Chinese Zhuyin character and the selected first tone for changing the ratio of the interface area A2 and the predetermined display area A1 of the display region 200. When the number of the Chinese characters corresponding to the first Chinese Zhuyin character, the second Chinese Zhuyin character and the first tone is more than the number of the display blocks B21-B2N, users may perform a gesture consisting of sliding to the left or to the right on the second display region 2022 for selecting the other Chinese characters corresponding to the first Chinese Zhuyin character, the second Chinese Zhuyin character and the selected first tone, but it is not limited thereto.

Figure 4E:
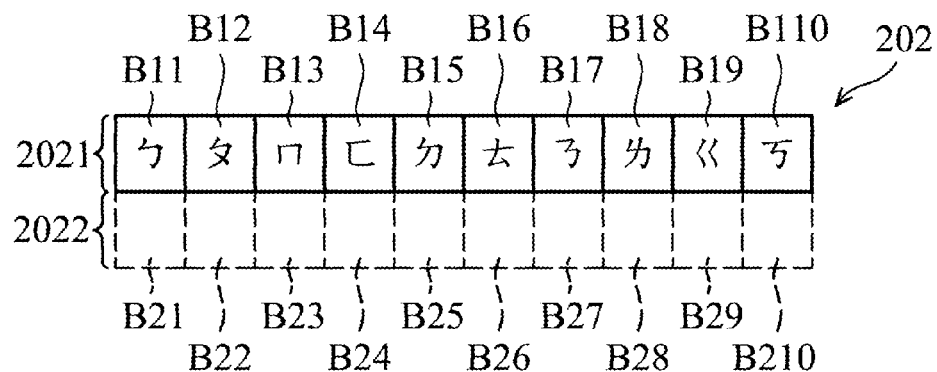

In another embodiment of the present invention, users may select one of the five tones of Chinese first. For example, when the input signal received by the input device 104 is an input signal in response to an operation on the Chinese default interface shown in FIG. 4A to select a first tone of the five tones of Chinese, the processing unit 108 enables the first display region 2021 to keep displaying the first set of the Chinese Zhuyin characters and remove the five tones on the second display region 2022. In this embodiment, the processing unit 108 is further arranged to enable the display blocks of the second display region 2022 to be transparent, such that the ratio of the interface area A2 and the predetermined display area A1 of the display region 200 is changed, as shown in FIG. 4E. In another embodiment, the processing unit 108 is further arranged to enable the first display region 2021 to display a fifth set of the Chinese Zhuyin characters corresponding to the selected first tone, but it is not limited thereto. The following operations are similar to the operations shown in FIGS. 4B-4D except that the tone of the Chinese character is selected. Therefore, the Chinese Zhuyin characters and characters displayed on the first display region 2021 and the second display region 2022 are further corresponding to the selected tone, and the five tones arranged to be displayed on the second display region 2022 are removed.

In another embodiment, the Chinese input rule table T1 is further arranged to record the characters that are frequently selected by users, and the frequently-selected characters have a higher priority to be displayed on the second display region 2022. Moreover, the text input interface 202 returns to the Chinese default interface after users select a character. In another embodiment, the text input interface 202 returns to the Chinese default interface and the Chinese default interface is further arranged to display a set of characters or vocabularies corresponding to the first character on the second display region 2022 after users select a first character. For example, the text input interface 202 backs to the Chinese default interface after users select character "專". Furthermore, the Chinese default interface displays not only the five tones on the second display region 2022 but also the characters "尃", "業", "家", "岠", "心", "利" corresponding to the first character "專" on the second display region 2022, but it is not limited thereto. In the above embodiment, the corresponding Chinese Zhuyin characters and tones can be combined with the selected Chinese Zhuyin character or tone to become a word (character), and the corresponding characters can be combined with the selected character to become a sentence or word.

Figure 5:
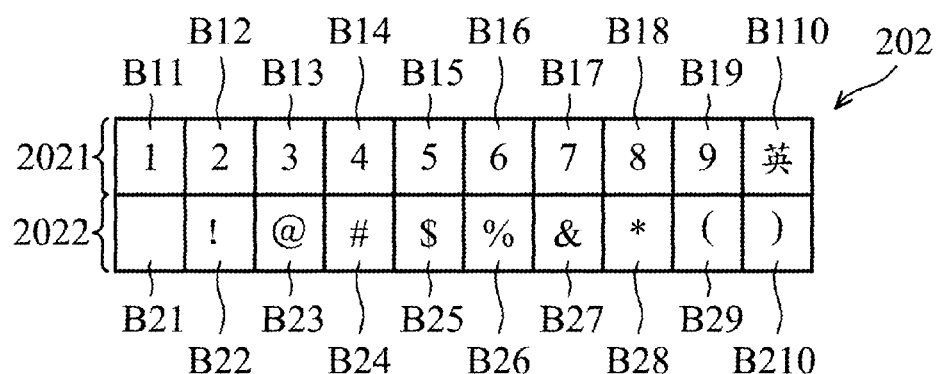
FIG. 5 is a schematic diagram illustrating an embodiment of a number/punctuation interface of the present invention.

FIG. 5 is a schematic diagram illustrating an embodiment of number/punctuation interface of the present invention. When the text input interface 202 is operated as a number/punctuation interface, the display blocks B11-B1N−1 of the first display region 2021 of the text input interface 202 are arranged to display a first set of a plurality of Arabic numbers, the display block B1N of the first display region 2021 is arranged to display an interface switching key, and the display blocks B21-B2N−1 of the second display region 2022 are arranged to display a first set of a plurality of punctuations, wherein the interface-switching key is arranged to enable the text input interface 202 to enter the English interface, but it is not limited thereto. For example, the display blocks B11-B19 are arranged to display a plurality of Arabic numbers "1", "2", "3", "4", "5", "6", "7", "8" and "9", the display blocks B11-B110 are arranged to display the interface switching key "英", the display block B21 is arranged to display the space key, the display blocks B212-B210 are arranged to display the first set of the punctuation marks "!", "@", "#", "$", "%", "a", "*" and "(", ")", but it is not limited thereto. In one embodiment, the display blocks B11-B1N of the first display region 2021 are not capable of displaying all of the Arabic numbers (0~9) at once, such that the first display region 2021 displays a first set of the Arabic numbers in sequence. When the input signal received by the input device 104 is a gesture sliding to the left and/or the right on the first display region 2021, the processing unit 108 enables the first display region 2021 to adjust the first set of the Arabic numbers by scroll tumbling in sequence. Moreover, the display blocks B21-B2N of the second display region 2022 are not capable of displaying all of the punctuations at once, such that the second display region 2022 displays a first set of the punctuations in sequence. When the input signal received by the input device 104 is a gesture sliding to the left and/or the right on the second display region 2022, the processing unit 108 enables the second display region 2022 to adjust the first set of the punctuations for displaying other punctuations by scroll tumbling. In this embodiment, the first display region 2021 has the display blocks B11-B110, and the second display region 2022 also has ten display blocks B21-B210, but it is not limited thereto.

Figure 6A:
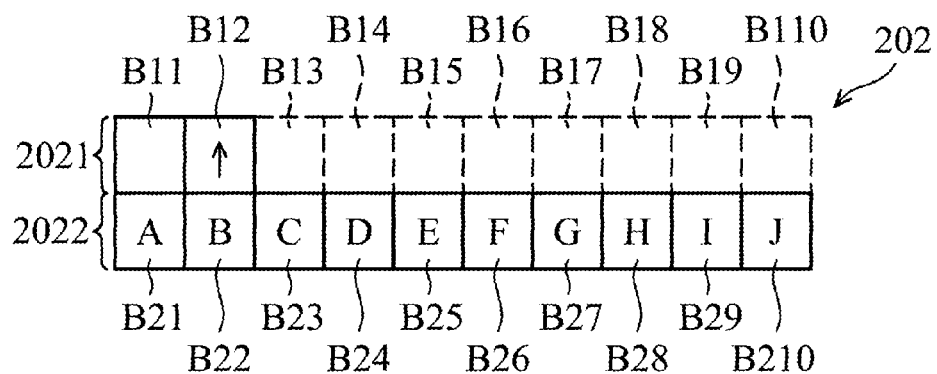
FIGS. 6A-6C are schematic diagrams illustrating embodiments of English interfaces of the present invention.

FIG. 6A is a schematic diagram illustrating a embodiment of English interfaces of the present invention. For example, the text input interface 202 has an English default interface when the text input interface 202 operates as an English interface, as shown in FIG. 6A shown. It should be noted that the English input rule table T2 corresponding to the English interface includes a variety of combinations of English letters and a variety of combinations of vocabularies/words, wherein the combinations of English letters can be determined by the relationship of the consonants and the vowels of the English letters. In the English default interface, the display block B11 of the first display region 2021 is arranged to display a space key, the display block B12 is arranged to display a case-switching key, and the second display region 2022 is arranged to display all of the English letters. It should be noted that, in one embodiment, the display blocks B21-B2N of the second display region 2022 are not capable of displaying all of the English letters at once, such that the second display region 2022 displays a first set of the English letters in sequence. When the input signal received by the input device 104 is a gesture sliding to the left and/or the right on the second display region 2022, the processing unit 108 enables the second display region 2022 to adjust the first set of the English letters for displaying the other English letters by scroll tumbling, wherein the operation of scroll tumbling can be referred to in FIG. 4A, but it is not limited thereto.

In this embodiment, the first display region 2021 has ten display blocks B11-B110, the second display region 2022 also has ten display blocks B21-B210, but it is not limited thereto. The display blocks B21-B210 are arranged to display a first set of English letters "A"-"J". When the input signal received by the input device 104 is a predetermined gesture that slides to the left on the second display region 2022, the processing unit 108 enables the second display region 2022 to display the English letters after the English letter "J". The processing unit 108 is further arranged to enable the display blocks of the first display region 2021 to be transparent except for the display blocks arranged to display the space key and the case switching key, such that the ratio of the interface area A2 and the predetermined display area A1 of the display region 200 is changed. Namely, the processing unit 108 is further arranged to enable the display blocks B13-B110 of the first display region 2021 to be transparent.

Figure 6B:
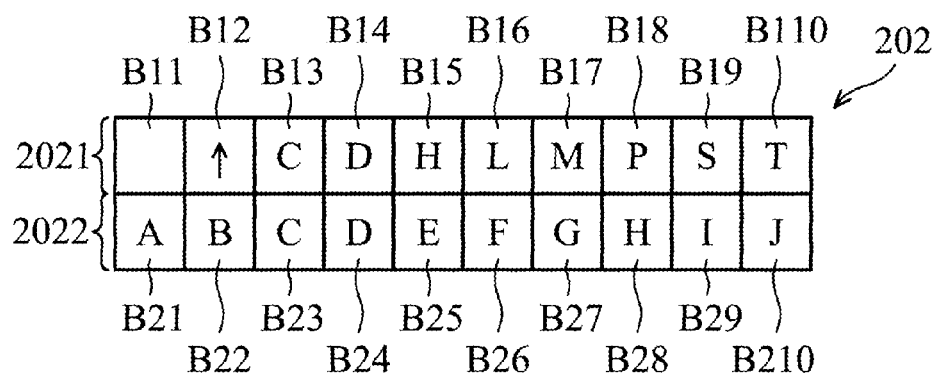

When the input signal received by the input device 104 is in response to an operation on the English default interface as shown in FIG. 6A and arranged to select a first English letter of the first set of the English letters, the processing unit 108 enables the first display region 2021 to display the space key, the case switching key and a second set of the English letters corresponding to the first English letter according to the English input rule table T2, and enables the second display region 2022 to keep displaying the first set of the English letters, and so on, until the user selects a word or the space key. For example, as shown in FIG. 6B, when the input signal received by the input device 104 is in response to an operation on the English default interface of FIG. 6A and arranged to select the English letter "a" of the first set of the English letters displayed on the second display region 2022, the processing unit 108 enables the display block B11 of the first display region 2021 to display the space key, enables the display block B12 to display the case switching key, and enables the display blocks B13-B110 to display a second set of the English letters "C", "D", "H", "L", "M", "P", "S" and "T" corresponding to the selected English letter "a" according to English input rule table T2, and enables the second display region 2022 to keep displaying the first set of the English letters. It should be noted that, in other embodiments, when the number of the second set of the English letters is less than the number of the display blocks B11-B1N, the processing unit 108 is further arranged to enable the display blocks of the first display region 2021 to be transparent except for the display blocks arranged to display the second set of the English letters for changing the ratio of the interface area A2 and the predetermined display area A1 of the display region 200. When the number of the second set of the English letters is more than the number of the display blocks B11-B1N, users may perform a gesture that is sliding to the left or to the right on the first display region 2021 for selecting the other English letters of the second set of the English letters.

Figure 6C:
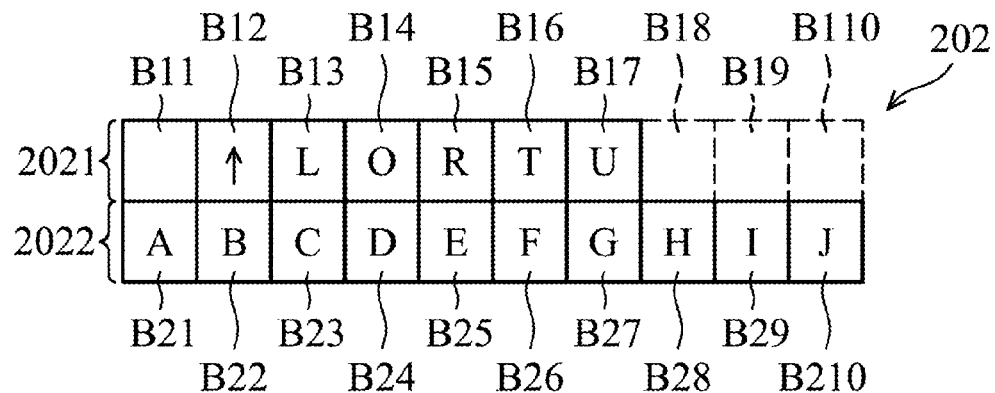

In another embodiment of the present invention, the processing unit 108 is further arranged to determine whether the number of the input signal(s) arranged to select the English letters is greater than a predetermined value. When the number of input signal(s) arranged to select the English letters is not greater than the predetermined value, the text input interface 202 keeps operating as the English default interface. The predetermined value is corresponding to the number of the selected English letters. For example. The predetermined value can be 2, 3, 4, 5, 6, etc., it is not limited thereto. When the number of input signal(s) arranged to select the English letters is greater than the predetermined value, the processing unit 108 enables the first display region 2021 to display a second set of the English letters corresponding to the selected English letters according to the English input rule table T2. For example, when the predetermined value is 3, the processing unit 108 waits for three English letters to be selected, and starts to enable the first display region 2021 to display a second set of the English letters corresponding to the selected three English letters according to the English input rule table T2 after the three English letters have been selected, as shown in FIG. 6C. FIG. 6C is a schematic diagram illustrating another embodiment of English interfaces of the present invention. When input device 104 has received the three input signals arranged to select the English letters "a", "p" and "p", the processing unit 108 enables the display block B11 of the first display region 2021 to display the space key, the display block B12 to display the case switching key and the display blocks B13-B17 to display the second set of English letters "L", "O", "R", "T" and "U" according to the English input rule table T2, the display blocks B18-B110 to be transparent, and enables the second display region 2022 to keep displaying the first set of the English letters.

Figure 7A:
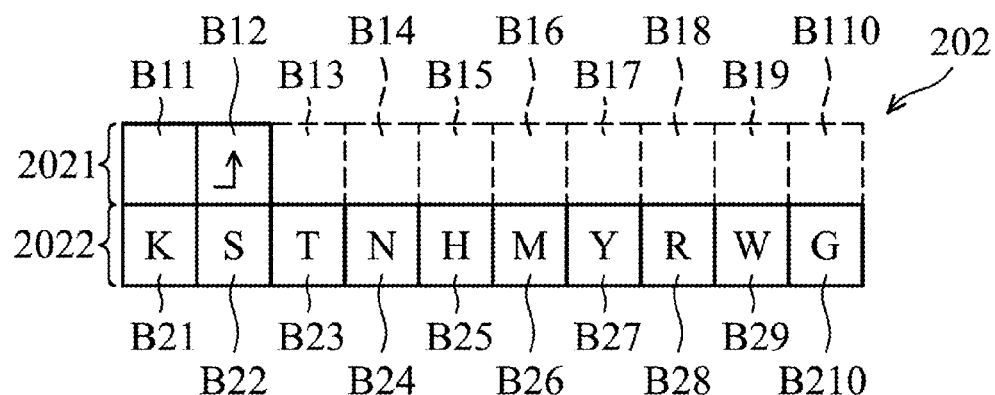
FIGS. 7A-7C are schematic diagrams illustrating embodiments of Japanese interfaces of the present invention.

FIG. 7A is a schematic diagram illustrating an embodiment of Japanese interfaces of the present invention. For example, the text input interface 202 has a Japanese default interface when the text input interface 202 operates as a Japanese interface, as shown in FIG. 7A. It should be noted that the Japanese input rule table T3 corresponding to the Japanese interface includes a variety of combinations of English letters that are used for constructing the Seionn, Dakuonn, Hanndakuonn, Sokuonn, Youonn and the Hatsuonn "ん" and a variety of combinations of Japanese words, wherein the variety of combinations of English letters may be determined by the relationship of the consonants and the vowel. The traditional Japanese language includes fifty phonetics and the Hatsuonn character "ん". Actually, the Japanese language only includes 46 phonetics (Seionn). Moreover, the Japanese language includes two writing types for the 46 phonetics, one is Hiragana and another is Katakana. Japanese language includes Seionn characters, Hatsuonn character "ん", Dakuonn characters, Hanndakuonn characters, Sokuonn characters, Hatsuonn characters, wherein all of the Seionn, Dakuonn, Hanndakuonn, Sokuonn and Hatsuonn can be constructed by a consonant and/or a vowel except for the Hatsuonn character. Furthermore, the Japanese language includes 14 consonants "K", "S", "T", "N", "H", "M", "Y", "R", "W", "G", "Z", "D", "B" and "P", and 8 vowels "A", "I", "U", "E", "O", "YA", "YU", "YO". In the Japanese default interface, the first display region 2021 is arranged to display a space key and an enter key, and the second display region 2022 is arranged to display all of the Japanese consonants. Moreover, the English letters "nn" indicates the Hatsuonn character "ん". Therefore, in the Japanese text input embodiments, the vowels further include "N" for selecting the Hatsuonn character "ん". In this embodiment, users can switch to the Hiragana input mode by entering the enter key after input typing the Japanese characters. Furthermore, users can switch to the Chinese character mode or the Katakana mode by selecting the space key. For example, the display block B11 of the first display region 2021 is arranged to display the space key, and the display block B12 is arranged to display the enter key, wherein the space key is arranged to switch between the Hiragana mode, the Katakana mode and the Chinese character mode. It should be noted that, in one embodiment, the display blocks B21-B2N of the second display region 2021 are not capable of displaying all of the Japanese consonants at once, such that the second display region 2022 displays a first set of the Japanese consonants in sequence. When the input signal received by the input device 104 is a gesture sliding to the left and/or the right on second display region 2022, the processing unit 108 enables the second display region 2022 to adjust the first set of the Japanese consonants for displaying the other consonants, wherein the operation of scroll tumbling can be referred to in FIG. 4A, but it is not limited thereto.

In this embodiment, the first display region 2021 has ten display blocks B11-B110, and the second display region 2022 also has ten display blocks B21-B210, but it is not limited thereto. The display block B11 is arranged to display the space key, the display block B12 is arranged to display the enter key. The processing unit 108 is further arranged to enable the display blocks of the first display region 2021 to be transparent except for the display blocks arranged to display the space key and the enter key, such that the ratio of the interface area A2 and the predetermined display area A1 of the display region 200 is changed. Namely, the processing unit 108 is arranged to enable the display blocks B13-B110 of the first display region 2021 to be transparent. The display blocks B21-B2N of the second display region 2022 are arranged to display the first set of Japanese consonants "K", "S", "T", "N", "H", "M", "Y", "R", "W" and "G", when the input signal received by the input device 104 is a predetermined gesture sliding to the left or to the right on the second display region 2022, the processing unit 108 enables the second display region 2022 to adjust the first set of the Japanese consonants to show the other Japanese consonants by scroll tumbling, wherein the operation of the scroll tumbling can be referred to in FIG. 4A.

Figure 7B:
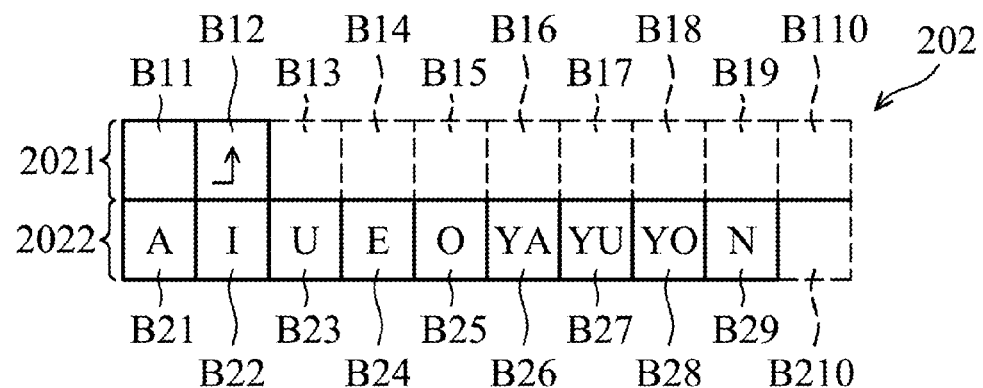

When the input signal received by the input device 104 is in response to an operation on the Japanese default interface of FIG. 7A and arranged to select a first Japanese consonant of a first set of the Japanese consonants, the processing unit 108 enables the first display region 2021 to keep displaying the space key and the enter key, and enable the second display region 2022 to display the Japanese vowels according to the Japanese input rule table T3. For example, as shown in FIG. 7B, when the input signal received by the input device 104 is in response to an operation on the Japanese default interface of FIG. 7A and arranged to select a first Japanese consonant of first set of the Japanese consonants displayed on the second display region 2022, the processing unit 108 enables the display block B11 of the first display region 2021 to keep displaying the space key, the display block B12 to keep displaying the enter key, the display blocks B13-B110 to be transparent, and the display blocks B21-B29 of the second display region 2022 to display the Japanese vowels "A", "I", "U", "E", "O", "YA", "YU", "YO", "N", and the display block B210 to be transparent. It should be noted that, in other embodiments, when the number of the Japanese vowels is more than the number of the display blocks B21-B2N, users may perform a gesture that is sliding to the left or to the right on the second display region 2022 to select the other Japanese vowels. It should be noted that the text input interface 202 backs to the Japanese default interface after users select a Japanese vowel on the interface of FIG. 7B.

Figure 7C:
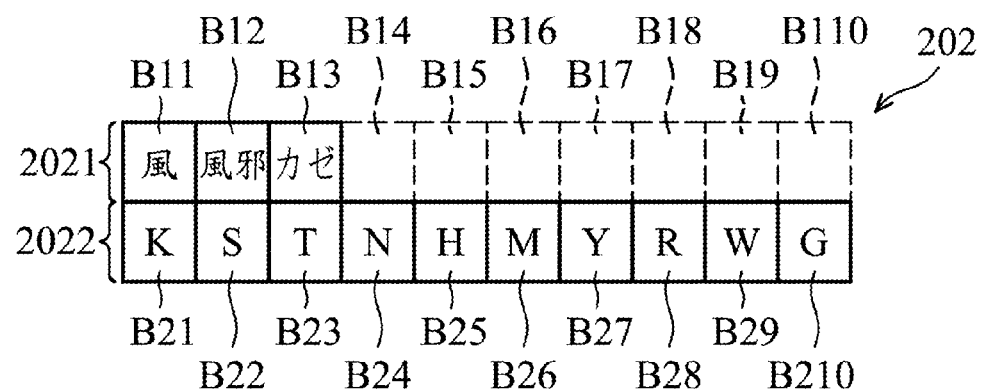

In one embodiment, the processing unit 108 is further arranged to display the Japanese Katakana(s) and/or the Chinese character(s) corresponding to the selected Japanese consonant and the selected Japanese vowel in response to the input signal corresponding to the space key. When the input device 104 receives the input signal corresponding to the space key, the processing unit 108, enables the first display region 2021 to display the Japanese Katakana(s) and/or the Chinese character(s) corresponding to the selected Japanese consonant and the selected Japanese vowel according to the Japanese input rule table T3, as shown in FIG. 7C. When the input device 104 receives the input signals arranged to select the "K", "A", "Z" and "E", the processing unit 108 enables the display blocks B11-B13 of the first display region 2021 to display the Japanese Katakana "カゼ" and the Chinese characters "風", "風邪" corresponding to the selected "K", "A", "Z" and "E" according to the Japanese input rule table T3, and the display blocks B13-B110 which are not in use to be transparent, and enables the second display region 2022 to display the first set of the Japanese consonants "K", "S", "T", "N", "H", "M", "Y", "R", "W" and "G".

Figure 8:
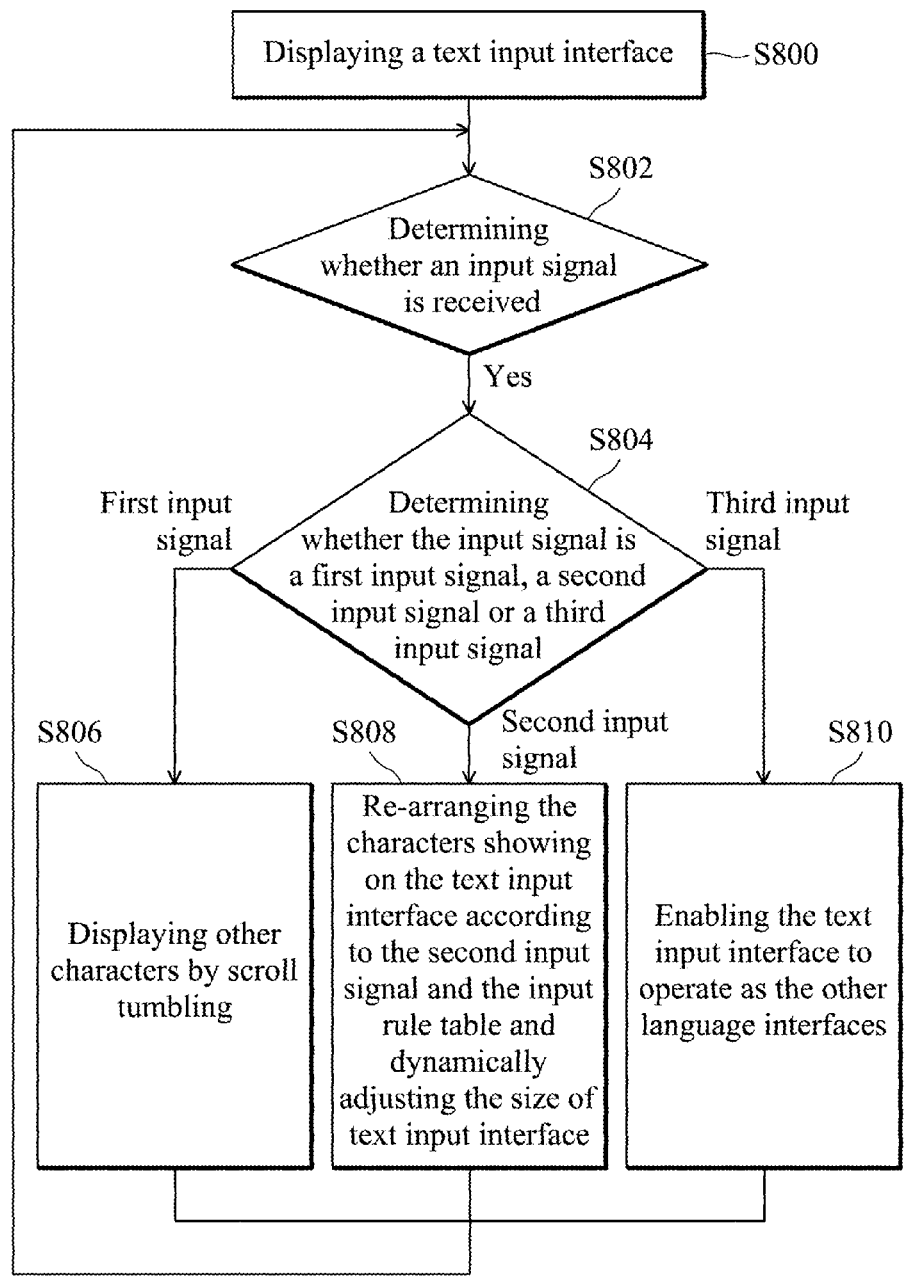
FIG. 8 is a flowchart of a text-input interface displaying method according to an embodiment of the present invention.

FIG. 8 is a flowchart of a text-input interface displaying method according to an embodiment of the present invention. The text-input interface displaying method is applied to the electronic device 100. The process starts at step S800.

In step S800, the display device 106 displays a text input interface 202 on the display region 200, as shown in FIG. 2. The details of step S800 can be referred to FIGS. 4A, 5, 6A and 7A.

Next, in step S802, the processing unit 108 determines whether the input device 104 has received an input signal. When the processing unit 108 determines that the input device 104 has received an input signal, the process goes to step S804, otherwise, the processing unit 108 continuous to determine whether the input device 104 has received an input signal.

In step S804, the processing unit 108 determines whether the input signal received by the input device 104 is a first input signal, a second input signal or a third input signal. The first input signal is a predetermined gesture which is sliding to the left or the right on the first display region 2021 or the second display region 2022. The second input signal is in response to an operation on the text input interface 202 and arranged to select the displayed character. The third input signal is a predetermined gesture sliding up and/or down on. When the input signal is the first input signal, the process goes to step S806. When the input signal is the second input signal, the process goes to step S808. When the input signal is a third input signal, the process goes to step S810.

In step S806, the processing unit 108 enables the first display region 2021 or the second display region 2022 to display other characters by scroll tumbling, respectively, according to the operation region of the second input signal. Next the process returns to step S802.

In step S808, the processing unit 108 is arranged to re-arrange the characters showing on the text input interface 202 according to the second input signal received by the input device 104 and the input rule table SRT stored in the storage device 102, and dynamically adjust the interface area A2 of the text input interface 202 for changing the ratio of the interface area A2 and the predetermined display area A1 of the display region.

In step S810, the processing unit 108 is further arranged to enable the text input interface 202 to operate as the other language interfaces. In the embodiments, the language interface includes a Chinese interface, an English interface, a number/punctuation interface and a Japanese interface, but it is not limited thereto. Next the process returns to step S802.

The electronic device 100 and the text-input interface displaying method of the exemplary embodiments may adjust the area of the text input interface, such that users can see more background or the desktop or applications while typing.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
a storage device, storing at least one input rule table;
an input device, receiving at least one input signal corresponding to a text editing;
a display device, displaying a text input interface, wherein the text input interface comprises a first display region and a second display region, the first display region and the second display region each comprising a plurality of display blocks, wherein each of the display blocks is arranged to display a character, wherein the first display region and the second display region are provided for users to do the text editing by the input device, wherein the display device has a display region, the display region has a predetermined display area, and the text input interface displayed on the display region has an interface area; and
a processor, in a first mode, displaying a first set of characters in the display blocks of the second display region, determining whether the input device receives a number of input signals corresponding to selection of characters of the first set of characters exceeding a predetermined value, and displaying a second set of characters in the display blocks of the first display region when the number of input signals corresponding to selection of characters of the first set of characters exceeds the predetermined value in the text editing, wherein the second set of characters leaves at least one display block in the first display region empty, the processor further making the at least one empty display block transparent and making the at least one empty display block accumulate at the end of the first display region, thereby dynamically adjusting the interface area of the text input interface to change the ratio of the interface area and the predetermined display area of the display region according to the input signals of the characters that have been selected and the input rule table, wherein the input rule table comprises a variety of combinations of characters that are used for constructing words.

2. The electronic device as claimed in claim 1, wherein the input device is a touch module disposed above the display region of the display device, and the processing unit enables the second display region to display other characters by scroll tumbling when the input signal received by the input device is a predetermined gesture performed on the second display region.

3. The electronic device as claimed in claim 1, wherein the text input interface is capable of switching between modes, the modes corresponding to a plurality of language interfaces, and the processor enables the text input interface to switch the language interfaces when the input signal received by the input device is a first predetermined gesture.

4. The electronic device as claimed in claim 3, wherein, in a second mode, the input rule table comprises a Chinese input rule table, and the text input interface has a Chinese default interface when the text input interface operates as a Chinese interface, wherein in the Chinese default interface a first set of Chinese characters comprising a first set of Chinese Zhuyin characters is displayed in the first display region, and a second set of Chinese characters comprising five tones of Chinese displayed in the second display region.

5. The electronic device as claimed in claim 4, wherein at least five of the display blocks of the second display region are in use in the Chinese default interface, and the processor further enables the display blocks of the second display region to be transparent except for the display blocks arranged to display the five tones of Chinese, thereby changing the ratio of the interface area and the predetermined display area of the display region.

6. The electronic device as claimed in claim 4, wherein when the input signal received by the input device is in response to an operation on the Chinese default interface and arranged to select a first Chinese Zhuyin character of the first set of the Chinese Zhuyin characters, the processor replaces the first set of characters with the second set of Chinese characters by enabling the first display region to display a second set of the Chinese Zhuyin characters corresponding to the first Chinese Zhuyin character according to the Chinese input rule table and enabling the second display region to display at least one of the Chinese characters corresponding to the first Chinese Zhuyin character and the five tones of Chinese.

7. The electronic device as claimed in claim 6, wherein when the second set of the Chinese Zhuyin characters is less than the display blocks of the first display region, the processor enables the display blocks of the first display region to be transparent except for the display blocks arranged to display the second set of the Chinese Zhuyin characters, thereby changing the ratio of the interface area and the predetermined display area of the display region.

8. The electronic device as claimed in claim 4, wherein when the input signal received by the input device corresponds to an operation on the Chinese default interface and is arranged to select a first tone of the five tones of Chinese, the processor enables the first display region to keep displaying the first set of the Chinese Zhuyin characters and remove the five tones of Chinese on the second display region.

9. The electronic device as claimed in claim 8, wherein when the input signal received by the input device is in corresponds to the operation on the Chinese default interface and is arranged to select the first tone of the five tones of Chinese, the processor enables the second display region to be transparent, thereby changing the ratio of the interface area and the predetermined display area of the display region.

10. The electronic device as claimed in claim 3, wherein, in a third mode, when the text input interface operates as a number/punctuation interface, wherein the first display region of the text input interface is arranged to display a first set of a plurality of Arabic numbers and an interface switching key.

11. The electronic device as claimed in claim 3, wherein, in a fourth mode, the input rule table comprises a Japanese input rule table, and the text input interface has a Japanese default interface when the text input interface operates as a Japanese interface, wherein the first display region is arranged to display a space key and an enter key in the Japanese default interface, and the second display region is arranged to display a first set of a plurality of Japanese consonants in the Japanese default interface.

12. The electronic device as claimed in claim 11, wherein the first display region has at least three of the display blocks, and the processor enables the display blocks of the first display region to be transparent except for the space key and the enter key, thereby changing the ratio of the interface area and the predetermined display area of the display region.

13. The electronic device as claimed in claim 11, wherein when the input signal received by the input device is a second predetermined gesture performed on the second display region, the processing unit enables the second display region to adjust the first set of the Japanese consonants to display other Japanese consonants by scroll tumbling.

14. The electronic device as claimed in claim 13, wherein when the input signal received by the input device is corresponding to an operation on the Japanese default interface and arranged to select a first Japanese consonant of the Japanese consonants, the processing unit enables the first display region to keep displaying the space key and the enter key, and enables the second display region to display a plurality of Japanese vowels and an "N" for selecting the Hatsuonn character "ん" according to the Japanese input rule table.

15. The electronic device as claimed in claim 14, wherein when the input signals received by the input device selects a first Japanese vowel of the Japanese vowels and the space key, the processing unit enables the first display region to display a plurality of Chinese characters and/or Japanese characters corresponding to the first Japanese vowel and the first Japanese consonant according to the Japanese input rule table, and enables the second display region to display the first set of the Japanese consonants.

16. The electronic device as claimed in claim, wherein, in the first mode, the input rule table comprises an English input rule table, and the text input interface has an English default interface when the text input interface operates as an English interface, wherein the first display region is arranged to display a space key and a case switching key in the English default interface, and the first set of characters and the second set of characters comprise a plurality of English letters in the English default interface.

17. The electronic device as claimed in claim 16, wherein the first display region has at least three of the display blocks, and by default the processor enables the display blocks of the first display region to be transparent except for the display blocks arranged to display the space key and the case switching key, thereby changing the ratio of the interface area and the predetermined display area of the display region.

18. The electronic device as claimed in claim 16, wherein when the input signal received by the input device is a second predetermined gesture performed on the second display region, the processing unit enables the second display region to adjust the first set of the English letters for displaying other English letters.

19. The electronic device as claimed in claim 16, wherein when the number of input signals corresponding to selection of characters of the first set of characters exceeds the predetermined value in the text editing, the processing unit enables the first display region to display the space key, the case switching key and the second set of characters according to the English input rule table and enables the second display region to keep displaying the first set of the English letters.

20. A text-input interface displaying method, applied to an electronic device having an input device and a display device, wherein the display device has a display region, the display region has a predetermined display area, the text-input interface displaying method comprises:
  displaying a text input interface on the display region, wherein the text input interface has a first display region and a second display region, the first display region and the second display region each comprising a plurality of display blocks, wherein each of the display blocks is arranged to display a character, wherein the first display region and the second display region are provided for users to do a text editing by the input device, and the text input interface has an interface area; and
  displaying a first set of characters in the display blocks of the second display region;
  determining whether the input device receives a number of input signals corresponding to selection of characters of the first set of characters exceeding a predetermined value;
  when the number of input signals corresponding to selection of characters of the first set of characters exceeds the predetermined value in the text editing, displaying a second set of characters in the display blocks of the first display region, wherein the second set of characters leaves at least one display block empty; and
  making the at least one empty display block transparent and making the at least one empty display block accumulate at the end of the first display region, thereby dynamically adjusting the interface area of the text input interface to change the ratio of the interface area and the predetermined display area of the display region according to the input signals of the characters that have been selected and an input rule table, wherein the input rule table comprises a variety of combinations of characters that are used for constructing words.

21. The text-input interface displaying method as claimed in claim 20, wherein the input device is a touch module disposed above the display region of the display device, and the text-input interface displaying method further comprises:
  when the input signal received by the input device is a gesture sliding to the left and/or right on the second display region, enabling the second display region to display other characters by scroll tumbling.

22. The text-input interface displaying method as claimed in claim 21, wherein the text input interface is capable of switching between a plurality of language interfaces, and the text-input interface displaying method further comprises enabling the text input interface to switch the language interfaces when the input signal received by the input device is a gesture sliding up and/or down.

23. The electronic device as claimed in claim 20, wherein by default the processing unit enables the first display region to display a space key and a case switching key, and when the number of input signals corresponding to selection of characters of the first set of characters exceeds the predetermined value in the text editing, the processing unit enables the first display region to display the space key, the case switching key and the second set of characters according to the English input rule table and enables the second display region to keep displaying the first set of the English letters.

* * * * *